Dec. 8, 1936.　　　　C. E. McMANUS　　　　2,063,454
CROWN CAP AND METHOD OF MAKING
Filed Aug. 4, 1932　　　　6 Sheets-Sheet 1
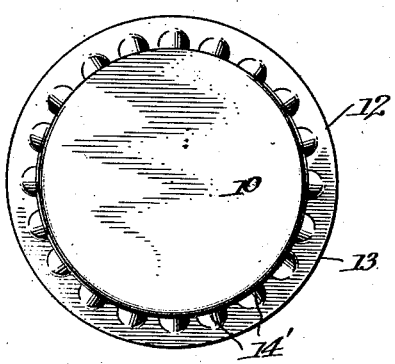
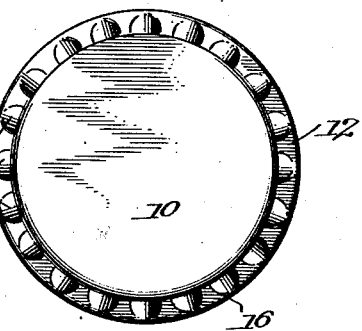
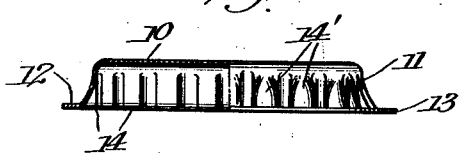
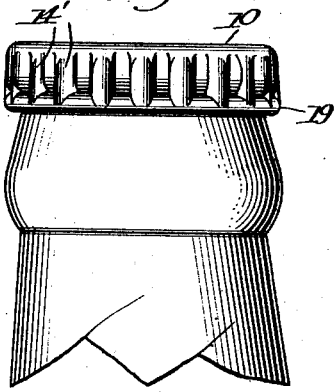
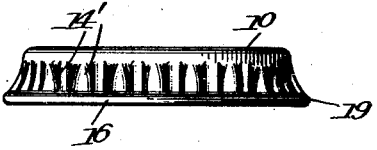
Inventor
Charles E. McManus.
By Cushman, Bryant, Darby & Cushman
Attorneys Dec. 8, 1936.  C. E. McMANUS  2,063,454
CROWN CAP AND METHOD OF MAKING
Filed Aug. 4, 1932  6 Sheets-Sheet 2

Inventor
Charles E. McManus
By Cushman, Darby & Cushman
Attorneys

Dec. 8, 1936.  C. E. McMANUS  2,063,454
CROWN CAP AND METHOD OF MAKING
Filed Aug. 4, 1932  6 Sheets-Sheet 3
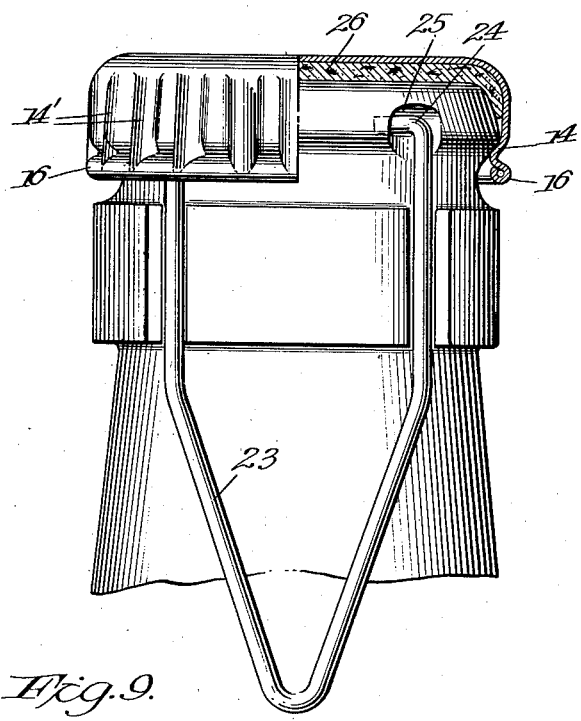
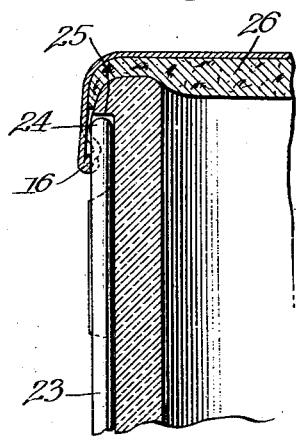
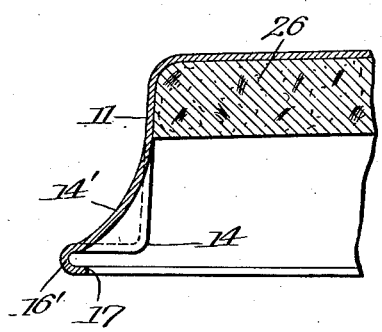
Inventor
Charles E. McManus Dec. 8, 1936. C. E. McMANUS 2,063,454
CROWN CAP AND METHOD OF MAKING
Filed Aug. 4, 1932   6 Sheets-Sheet 4

Inventor
Charles E. McManus.
By Ashman Bryant Darby Hickman
Attorneys

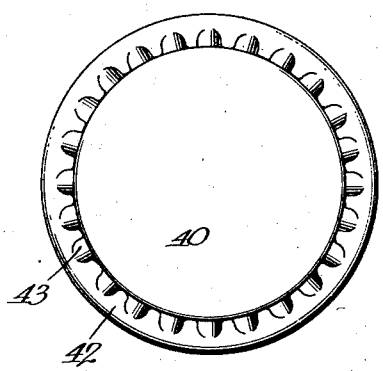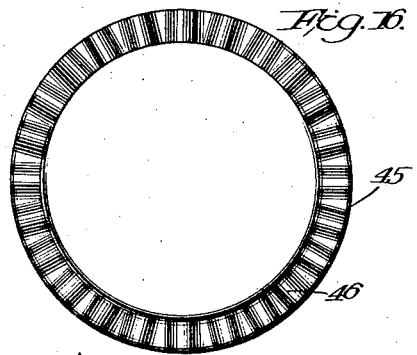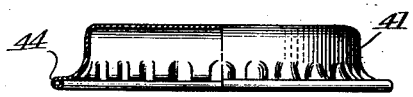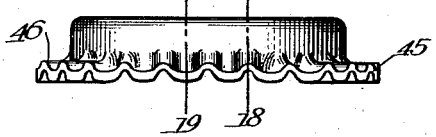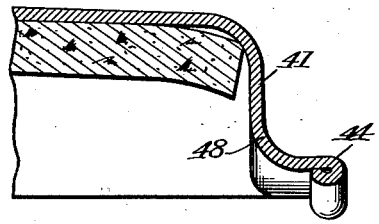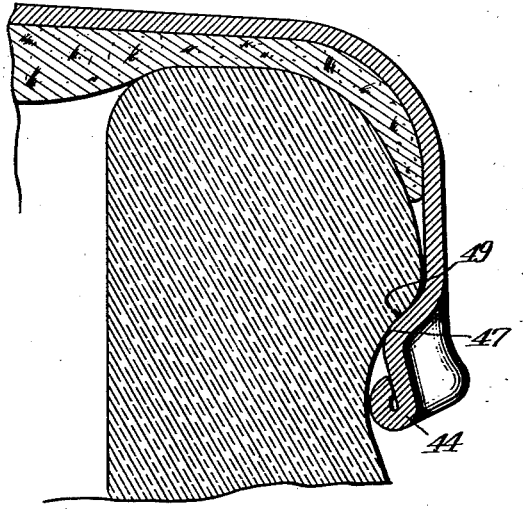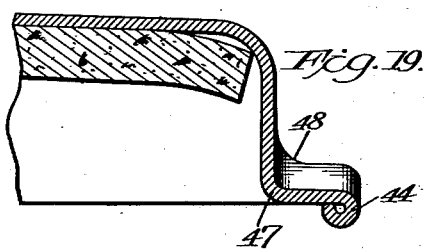

Dec. 8, 1936.  C. E. McMANUS  2,063,454
CROWN CAP AND METHOD OF MAKING
Filed Aug. 4, 1932   6 Sheets-Sheet 6
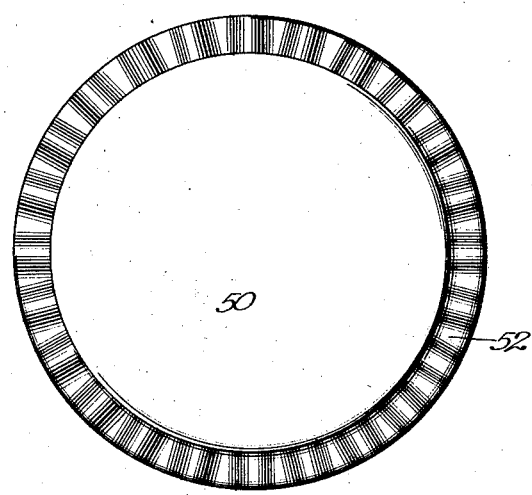
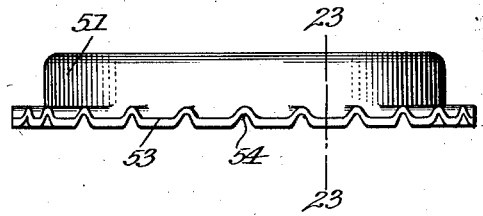
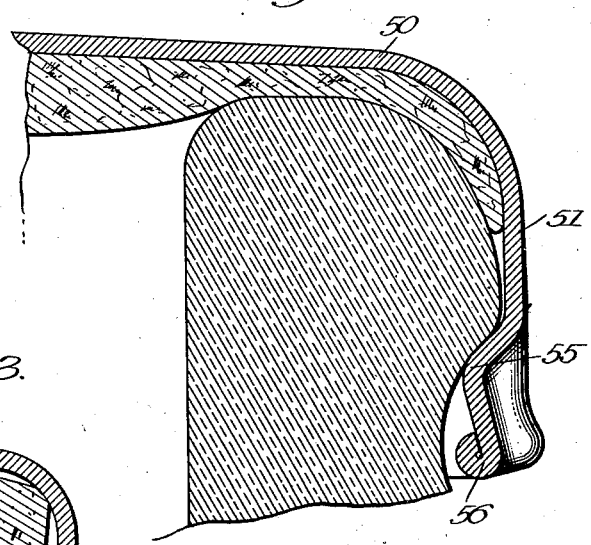
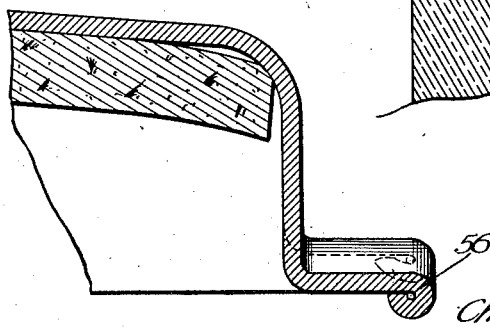
Inventor
Charles E. McManus.

Patented Dec. 8, 1936

2,063,454

UNITED STATES PATENT OFFICE 2,063,454

CROWN CAP AND METHOD OF MAKING

Charles E. McManus, Baltimore, Md., assignor to Crown Cork & Seal Company, Inc., Baltimore, Md., a corporation of New York Application August 4, 1932, Serial No. 627,492

3 Claims. (Cl. 215—39)

My invention is a cap and more particularly a metal cap of the crown type. This type of cap, as used for many years, has been of the construction disclosed in the patents to Painter, No. 468,227 and 468,258, granted February 2, 1892, and as is well known, this type of cap is particularly used to seal liquids, such as ginger ale and other carbonated beverages, which must be maintained under high pressure.

A primary object of the invention is to provide a cap which is an improvement upon the conventional crown cap of these patents. As disclosed in the said patents, a crown cap is characterized by a metallic shell having a top and a depending skirt. The skirt is flared outwardly by the ribs of corrugations which provide inwardly directed shoulders. The corrugations extend from a line just below the top of the shell to the exposed raw edge of the shell. When applied to a container, the flaring skirt is forced inwardly so that the inwardly directed shoulders defined by the corrugations or crimps engage beneath a locking shoulder surrounding the mouth of the container adjacent the lip of the same, and the corrugated exposed raw edge of the skirt is maintained remote from the adjacent surface of the container to provide a circumferentially continuous space which is adapted to receive an opener in order to prize the cap.

I have discovered and disclose in this invention that it is possible to retain the essential characteristics of a crown cap and to reduce materially the cost of manufacture, to increase its sealing efficiency, and to render it generally more satisfactory in use.

The standard metal crowns are reasonably satisfactory, but, in view of the tremendous increase in the manufacture and sale of bottled goods and the variety of such goods which must be capped, the cap industry is compelled to provide a cap which is better appearing and less expensive, which will enable a seal to be maintained against higher pressures, and which will be more sanitary than conventional crowns.

The invention, therefore, consists in producing a cap including a metallic shell having a depending skirt formed with corrugations which priduce inwardly directed locking shoulders and outwardly directed ribs. The said corrugations flare downwardly and outwardly from the top of the shell and terminate inwardly from the periphery of a flange having a circular edge curled therebeneath but spaced radially outwardly from the locking shoulders. The invention further consists in utilizing in such a cap a cushioning liner and metal both of substantially less thickness than has heretofore been practicable in the manufacture of crown caps. A further feature of the invention is the retention of the opener receiving space between the curled edge of the cap and the adjacent container surface. Such opener receiving portion, however, is characterized by the fact that the corrugations do not open thereinto. Hence, there are no open or exposed pockets defined by the corrugations and in which matter can collect, as with the raw edge crown where the corrugations extend completely to the raw edge and are not protected and sealed by the curled edge.

I have found that a number of vitally important and unexpected advantages are obtainable by providing a crown cap with a flange having an edge curled, preferably inwardly and sufficiently to conceal the raw edge, and maintained radially remote from the inwardly directed locking shoulders formed by the corrugations, so that when applied to a container or bottle having the usual crown finish there is provided a space between the curled edge and the container surface to receive an opener.

For example, it is possible to use a substantially lighter gauge or thinner metal and an appreciably thinner cushioning disc than have heretofore been found practicable in the manufacture of crown caps. Moreover, it is possible to use less adhesive for uniting the cushion disc to the caps and for adhering center spots to the cushion discs, as well as less expensive adhesive.

Furthermore, I have found that by the changes in construction, the crown cap is materially improved. Its sealing efficiency is increased, it does not tend to distort when prized as readily as the conventional crown, thereby rendering it more suitable for reapplication to the container. It does not as readily become mutilated and does not rust or collect foreign matter. These are objections to the present standard crown which have largely restricted its field of use.

The foregoing and other advantages which will be hereinafter set forth more in detail I have discovered are obtainable by modifications of the standard crown which are relatively simple but which, by reason of the retention of the essential characteristics of the crown cap, largely permit use in manufacture of the machinery now employed in crown cap production.

A primary object of the invention is to provide a crown cap which may be more economically manufactured by reason of the use of thinner metal, of cork discs of decreased gauge and of substantially less adhesive than has heretofore been necessary.

A further object of the invention is to provide a crown cap having increased sealing efficiency and resistant to pressures higher than it has heretofore been practicable to seal with the conventional crown cap.

A further object of the invention is to afford a crown cap which has less tendency to become distorted when removed, which resists rusting and does not collect foreign matter in use, and which is better appearing than the ordinary crown.

I am aware that it has heretofore been proposed to fold or hem the edge of a crimped cap, that is, a cap retained in position by frictional engagement with the periphery of the container wall. It has never heretofore been suggested that a crown cap characterized by a plurality of instruck locking shoulders which fit and lock beneath a shoulder upon the container, may be improved by providing a curled or beaded edge of the present invention and that this feature coacts with the other characteristic features of a crown cap as herein described.

The foregoing and other objects and characteristics of the invention will become clearer as the description proceeds in connection with said improved embodiments illustrated in the accompanying drawings, wherein:

Figure 1 is a top view of a cap blank.

Figure 2 is an edge view partly in section of the blank shown in Figure 1.

Figure 3 is a top view of the finished cap.

Figure 4 is a side elevation view of the finished cap.

Figure 5 is a side elevation view showing the cap applied to a bottle.

Figure 8 is a view partly in section showing the improved cap applied to a container having a modified finish and opener.

Figure 9 is a view in section substantially similar to that shown in Figure 7, but taken on the line 9—9 of Figure 8.

Figure 10 is a view of a modification of the invention showing in section the edge curled inwardly but forming an open wire or bead.

Figure 14 is a top view of a corrugated hat-shaped blank.

Figure 15 is a view partly in section and partly in elevation showing the blank of Figure 14 provided with a curled tubular edge or bead.

Figure 16 is a top view of the blank shown in Figure 15 having the flange thereof corrugated to produce a wavy or corrugated peripheral edge.

Figure 17 is a side elevation of the cap shown in Figure 16.

Figure 18 is a sectional view taken on the line 18—18 of Figure 17.

Figure 19 is a view taken on the line 19—19 of Figure 17.

Figure 20 is a sectional view showing the cap of Figures 16 and 17 applied to a container and taken through one of the inwardly directed locking ribs.

Figure 21 is a top elevation of a blank having the flange thereof crimped or corrugated and the peripheral edge similarly corrugated after the manner of the cap described in the application of Elder, Ser. No. 615,910, filed June 7, 1932.

Figure 22 is a side elevation of the cap shown in Figure 21.

Figure 23 is a sectional view on the line 23—23 of Figure 22.

Figure 24 is a sectional view showing the cap of Figure 22 applied to a container and taken through one of the inwardly directed locking shoulders.

Figure 6:
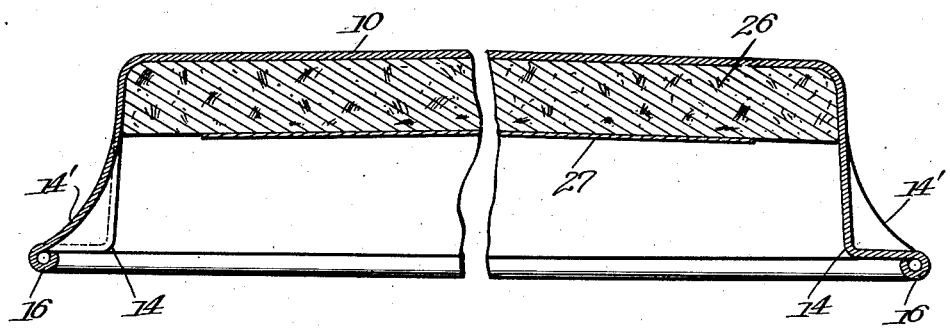
Figure 6 is a view in section showing at the left a section through an outwardly forced rib of the corrugations and at the right a section through one of the inwardly projecting locking shoulders of the corrugations.

Referring to Figures 1 and 2, I have illustrated a metal cap blank which is generally of hat-shape construction; it has a top 10 and a depending skirt 11 terminating in a flange 12. The flange 12 extends at substantially a right angle to the skirt and has a circular peripheral edge 13, as shown in Figure 1.

The blank may be formed in any suitable manner, as in a stamping machine of the character now employed, so that, as stamped from the sheet of metal, it is provided around the skirt with corrugations which form inwardly extending locking shoulders 14 (Fig. 6) spaced circumferentially of the cap and alternating with outwardly directed ribs 14' in the manner of the conventional crown. As will be understood, the shoulders 14 engage beneath the usual locking shoulder 15 (Figure 7) on a container and maintain the cap in position.

As illustrated in Figures 1 and 2, these corrugations extend from a line immediately below the top 10 to the flange but are spaced inwardly from the peripheral edge 13 of the flange so as to leave outwardly from the base of the ribs 14' a portion of the flange which may be rolled to provide a curled peripheral edge.

The completed cap (Figures 3 and 4) has the edge of the flange 12 curled, preferably inwardly, to form beneath the flange a wire or bead 16. As will be clear from Figure 6, I prefer to curl the margin of the flange sufficiently to conceal the raw edge. At times, however, it may be preferred not to close the bead completely, as illustrated in Figure 10, so as to provide a wire or bead 16' having the raw edge 17 directed inwardly but not concealed. A bead of this construction may be preferred in some instances.

When a blank of the character shown in Figures 1 and 2 is employed, the peripheral edge 19 of the finished cap will be smooth or uncorrugated so as to constitute a true circle. In other words, the lower ends of the outwardly directed ribs 14' forming the corrugations are disposed inwardly from the peripheral edge 19.

Figure 7:
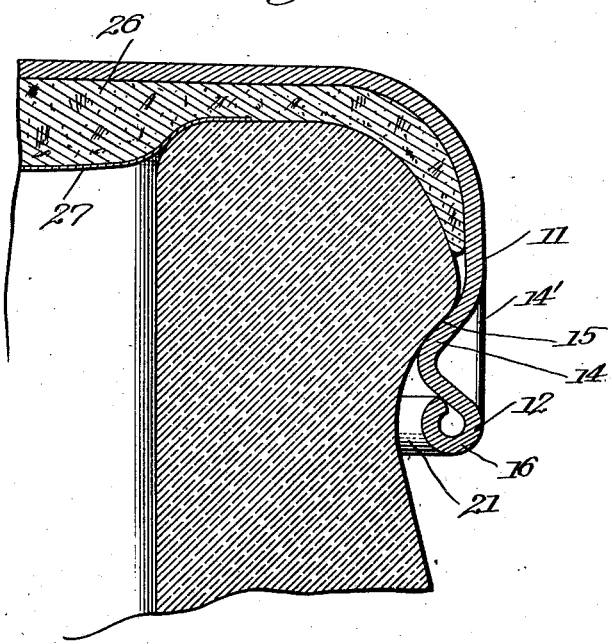
Figure 7 is a fragmentary sectional view showing the cap applied to the bottle and wherein the position of the wired edge is illustrated as remote from the adjacent surface of the bottle.

Referring to Figures 6 and 7, it will be noted that between the outwardly pressed ribs of the corrugations, the flange 12 joins the skirt 11 at substantially a right angle, thereby providing the shoulders 14 and the wire or bead 16 or 16' spaced radially outwardly from the locking shoulders.

When the cap is applied (Figures 5 and 7) pressure is exerted upon the outwardly projecting ribs of the corrugations, thereby deflecting the wire or bead downwardly from a position in a plane at right angles to the axis of the cap to a position substantially in line with the skirt as shown in Figure 7. By reason of the radially spaced relation of the shoulders 14 and the wire 16, the latter is positioned remote from the adjacent surface of the container beneath the locking shoulder thereon when the shoulders 14 engage the bottle shoulder 15, whereby to provide a circumferentially extending and continuously uninterrupted space 21 between the wire and the bottle neck into which an opener may be inserted in the usual manner. As in the conventional crown, the locking action is effected by the engagement of the inwardly projecting shoulders 14 with the downwardly and inwardly inclined surface which forms the locking shoulder on the bottle.

But in the present instance, the wire or bead 16 at the lower edge of the cap performs a number of important functions. It strengthens the locking action effected by the engagement of the shoulders 14 with the shoulder 15 of the bottle. It provides a reinforce for the skirt of the cap throughout its entire circumference, and causes the ribs to maintain a more secure locking engagement. This is probably due to the fact that since the outwardly projected ribs 14' of the corrugations (Figure 7) extend downwardly to the curled edge the latter strengthens these ribs which serve to maintain the inwardly projected shoulders 14 against the locking shoulder 15 of the bottle. The reinforcing effect of the wire at the edge of the cap resists any tendency of the cap to spread, and, likewise, assures that the locking relation of the cap with the bottle shoulder will be uniform about the circumference of the bottle locking shoulder. Moreover, the wire constitutes an effective means for preventing or minimizing distortion of the cap when it is removed, as by the insertion of an opener between the wire and the adjacent surface of the bottle. As is well known, the conventional crown when prized, is frequently distorted to such an extent that it cannot be reapplied. This occurs particularly with openers having a narrow cap engaging portion, such as the edge of a flat sheet-like element or a wire opener. The curled edge provides a means for transmitting circumferentially of the cap the levering force applied at one or more points so that localized pressure which would otherwise distort the cap is transmitted for a considerable distance to each side of the point or points of contact of the opener with the cap. The curled edge by transmitting circumferentially the levering force to each side of the point of contact of the opener with the cap, enables a much larger area of the skirt to be levered. This not only decreases the amount of levering force required to remove the cap, but materially reduces the distortion.

It will be seen that by reason of the downward and inward deflection or distortion of the flange 12 and bead 16, when the cap is applied to the container, that the shoulders 14 will have their engaging areas with the container substantially increased, thus providing a tighter and more effective seal than is obtainable by a crown in which the lower end of the skirt or flange flares outwardly. Moreover, due to the bead 16 being moved beneath the corrugations 14 into substantially vertical alignment with the skirt, there is provided a continuous, smooth non-flaring external skirt surface which may conveniently be handled without injury to the user.

Since a relatively slight lifting force is necessary, the cap will not be substantially distorted. Moreover, the spreading of the cap when lifted has been found to be more temporary than in a conventional crown, due to the added resilience supplied by the curled edge. Hence, the cap has a greater tendency to resume its original shape which is of vital importance when the cap is used upon containers which must be recapped after being originally opened, due to the fact that the contents are to be used from time to time.

These advantages are particularly important and desirable in connection with a finish and opener of the type described in the patent to Darling, No. 1,777,077, granted September 30, 1930. When used with certain materials the conventional raw edge crown has been found somewhat objectionable, particularly because of its tendency to become distorted when removed by an opener of the type disclosed in this patent. The opener, as shown, consists of a length of wire reversely bent to form a yoke 23 having its free ends 24 forming supporting trunnions which project into and are pivotally engaged with recesses or seats 25. This opener is applied to the bottle before the cap is positioned thereon. As will be observed, although this opener when lifted engages the cap substantially at two points, the lifting pressure applied thereby is transmitted by the bead 16 circumferentially to each side of the points of contact and distortion of the cap is minimized. When lifted the opener bears directly against the wire or bead which forms a reinforce for the cap at the point of engagement of the opener therewith, thereby resisting outward distortion at the points of contact. The reduction in levering force required for lifting the cap is particularly important in connection with a wire opener of this type, since the opener tends to bend readily.

As in the conventional crown, the cap is provided with a liner of cushion material 26, and for this purpose natural or composition cork usually in the form of a disc, is suitable. The cork disc may be faced with a center spot 27 of paper, foil or other material, as disclosed in the patent to McManus, No. 1,339,066, granted May 4, 1920. The cork disc is united to the cap and the center spot united to the cork by adhesive, preferably a heat coagulated adhesive, such as albumen. Such an adhesive is described in the patent to Alberti, No. 1,199,026, granted September 19, 1916. In this connection a pressure sensitive or heat sensitive adhesive, as well as a heat coagulable adhesive may be employed to unite the cork liner to the crown and the spot to the liner.

The cap is produced from sheet metal of substantially less thickness than is now employed in making the conventional crown cap. In the crown cap industry it has been customary for years to employ tin plate sheet metal known as 107 lb. plate. This means that the base box of 112 sheets, 14" x 20" in size, weighs 170 lbs., due to the thickness of the metal, as compared to the base box of the same size (14" x 20") and number (112) of sheets, which is standard in the sheet metal industry and which weighs 100 lbs. Translated into terms of the thickness of the sheet, the sheet metal of the standard base box (112 sheets 14" x 20", weighing 100 lbs.) is known as 100 lb. plate, and has a thickness within the range of .0117. The 107 lb. plate now employed in the manufacture of crown caps has an average thickness within the range of .0105" to .0130". In the manufacture of the cap of the present invention, it has been found both practicable and desirable to reduce the thickness substantially, and I prefer to use 80 lb. plate. That is to say, the base box (112 sheets, 14" x 20") weighs 80 lbs., as compared to the 107 lb. weight of the tin plate now in use; and this 80 lb. plate has a thickness within the range of .0075 to .0100". Its use constitutes a substantial saving in cost of metal, and is merely one item of the saving possible in the manufacture of the improved cap of the present invention.

In addition to thinner metal, it has also been found possible to employ liner discs of cushion material having a substantially decreased thickness. It has been the practice to employ cork liners or inserts of a thickness approximately .095". In my improved cap cork discs having a thickness of from .070" to .080" are used.

In addition to the savings in metal and cork, there results also a very decided economy both in the adhesive used and the process required to effect the adhesive union of the cork disc to the metal and of the center spot to the cork. I find that less adhesive is required, and, furthermore, by reason of the reduced gauge of metal, as well as of the cork discs, an adhesive of less expensive composition may be utilized. These economies in the cost of manufacture when translated, represent a saving in production of several mills per gross and at least four mills; 12% on tin, 16% on cork; gas for coagulating the adhesive 3 to 5%; albumen adhesive 15 to 20%. When it is remembered that over eighty million (80,000,000) gross of crown caps are manufactured and sold annually, the total saving is over three hundred thousand dollars.

In use, it has been found that this cap will maintain a seal against pressures substantially higher than it has heretofore been practicable to seal with a conventional crown. An ordinary crown cap will not maintain a seal against an air pressure substantially in excess of 130 lbs.; the cap of this invention maintains a perfect seal against air pressures higher than 260 lbs. The ordinary crown will not maintain a seal against water pressure substantially in excess of 240 lbs., whereas extensive use and tests have shown that the cap of this invention will maintain a seal against a water pressure higher than 350 lbs.

The invention offers a number of other substantial advantages in the use of the cap. The edge of the blank of the cap being concealed by the wire or bead, particularly in the form of Figures 5 and 6, is thoroughly protected against rusting which is a serious objection to the usual crown cap, particularly in many fields of use; this objection has, to a large extent, restricted the use of the crown cap. Moreover, the edge being smooth and uncorrugated, does not tend to collect the container contents or foreign matter and the space between the curled edge and the bottle is a smooth and continuous one as distinguished from the open, exposed pockets provided by the usual crown with its corrugated raw edge. That is, the corrugations of the cap of this invention do not open into the space between the skirt and the bottle, i. e., the opener receiving space, and hence there is substantial protection against the possibility of objectionable matter collecting and remaining in this space. Moreover, the raw edge being concealed does not scratch or mar the ornamental finish of the crowns as frequently occurs both in packing the caps in the manufacturing plant and in the hoppers of the bottling machines.

The foregoing advantages are obtained without sacrificing the essential characteristics of a crown cap, namely, (1) the inwardly directed locking shoulders formed on the corrugated skirt, and (2) the continuous uninterrupted space between the edge of the cap and the bottle finish for the reception of an opener. The invention is thus to be distinguished from modifications of crown caps, such as that disclosed in the patent to Painter, No. 582,762, May 18, 1897, in which neither of these characteristics is retained. Consequently, the cap may be removed from any type of bottle having a crown finish and by any of the numerous types of openers now available for removing the standard crown cap, and since distortion is reduced to a minimum, the cap may be reapplied.

From a manufacturing standpoint, the cap of the present invention offers further advantages in economy. As heretofore explained, the blank of Figures 1 and 2 may be stamped from a sheet of tin plate in the manner of the usual cap. The flange of the blank may then be suitably curled. Or, if desired, a hat-shaped blank similar to that shown in Figure 1, but devoid of corrugations, may be produced and thereafter the corrugations and the wire may be formed either simultaneously or in consecutive steps. The forming of the corrugations and wire from a plain blank may be accomplished either in the same machine or in separate machines. For example, if a blank of the character shown in Figures 1 and 2 having the corrugations therein is stamped from the metal plate, the wire may then be curled in a machine of the type disclosed in the copending application of Eric B. Kramer, Serial No. 552,493, filed July 22, 1931. Obviously, the same or similar machines may be used for both corrugating and curling when the hat-shaped blank produced similar to that of Figures 1 and 2 does not contain the corrugations. It will be clear, therefore, that the invention, by retaining the dominant characteristics of the crown cap, permits the use of existing machinery for its production, and, although, the edge is curled, this operation does not appreciably increase the manufacturing expense as compared to the standard crown now in use.

Figure 11:
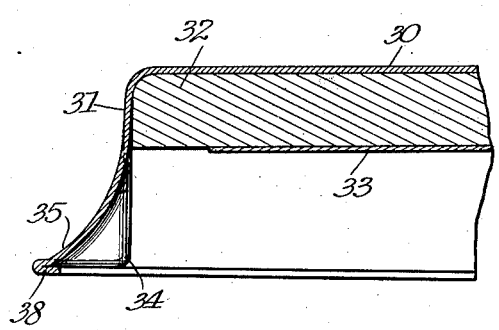
Figure 11 is a sectional view partly cut-away of a modified cap and taken through the ridge of a corrugation.
Figure 13:
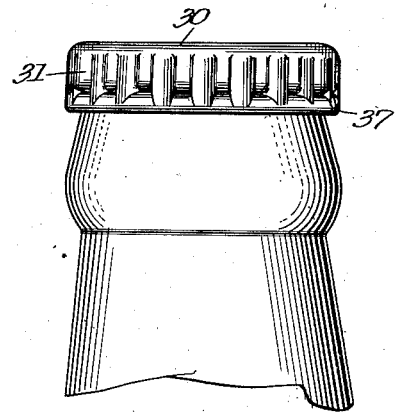
Figure 13 is a side elevation of the cap shown in Figures 11 and 12 applied to a container.
Figure 12:
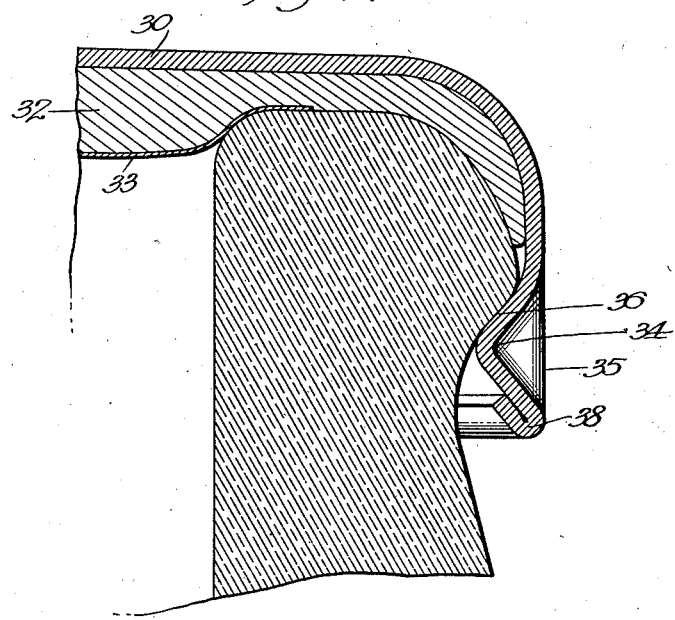
Figure 12 is a sectional view showing the cap of Figure 11 applied to a container and taken through one of the inwardly directed locking shoulders.

I propose to employ not only a tubular or semi-tubular edge as shown in Figures 6 and 10, but also a substantially flattened curled edge. Referring to Figures 11, 12, and 13, such a construction is there illustrated. The flattened curled edge as shown in these figures is produced by initially forming a substantially tubular coil of the type shown in Figure 10 and then collapsing the bead, or it may be obtained by producing a substantially flattened reinforced edge in one operation. That is to say, the blank may be stamped out with a corrugated skirt, with the corrugations terminating short of the end of the flange, and thereafter, the flange bent inwardly to produce a coil which is subsequently collapsed. Also, by a single operation, the blank may be stamped with a crimped skirt and an inwardly coiled edge and then flattened or the collapsing may be simultaneous with the stamping of the blank.

In Figure 11, the cap is indicated at 30 and the skirt at 31, a suitable cushion liner 32 being positioned within the skirt and may have a center spot 33. The skirt of the cap is provided with crimps or corrugations defining inwardly directed locking shoulders 34 and outwardly extending ribs 35, the said locking shoulders, when the cap is positioned upon a container, engaging beneath the locking shoulder 36 thereof (Fig. 12) after the manner of a crown cap. The corrugations do not extend to the peripheral edge of the cap, but their lower ends terminate short thereof so that the exposed edge of the cap presents a substantially smooth or circular non-corrugated surface 37. The flange of the blank from which the cap is formed, is bent or collapsed inwardly as shown at 38 to provide a reinforcing edge for the cap which, as shown in Figure 12, when the cap is applied to a container, is radially spaced from the container wall.

The cap illustrated in Figures 11, 12, and 13, therefore, is distinguished by having a substantially flattened bead or curled edge which is inwardly directed as shown in Figure 11 and which edge is substantially smooth and unobstructed, since the lower ends of the corrugations terminate short of the periphery of the edge of the cap.

It will be observed that this construction is characterized by the essential features of the forms hereinbefore described, namely (a) the spacing of the wire or bead from the in-struck locking shoulders both before the cap is applied to the container and thereafter, (b) the disposition of the reinforce spaced from the adjacent wall of the container after application of the cap to the container, (c) the substantially circular edge which is smooth or uncorrugated, and (d) the location of the reinforce so that it substantially closes the lower ends of the grooves or channels formed by the corrugations. This and other characteristics all of which are common to the various forms of the invention, will be apparent to one skilled in the art.

In some instances, it is desirable to extend the corrugations entirely to the edge of the flange of the cap so that the beaded edge, as well as the skirt is corrugated. For example, in Figures 14 to 20, I have shown such a construction. In this form of the invention, the blank 40 will be initially formed with a skirt 41 and a flange 42; the skirt is crimped as shown at 43, and the edge of the flange is curled inwardly to form a preferably tubular bead 44. Thereafter, the cap so formed has the flange and beaded edge thereof crimped to produce a corrugated or wavy edge 45, as well as a substantially completely corrugated flange 46. If desired, the cap may be produced in a single operation with the curled edge 44 and corrugated portion 43, and thereafter subjected to the operation necessary to corrugate the flange and beaded edge. Or all of these operations may be simultaneously performed or in any desired sequence.

In Figure 19, I have shown in section the inwardly directed locking shoulders 47 and in Figure 18 by a similar view, I have illustrated the outwardly directed ribs 48 which form the channels of the corrugations. These views show the radial disposition of the corrugated and beaded edge. As will be noted (Figure 18), the portion of the bead within the outwardly directed ribs 48 is partially collapsed from the substantially tubular form which is maintained (Figure 19) in the transverse planes of the in-struck locking shoulders 47.

In Figure 20, the cap of Figures 16 and 17 is shown applied to a container and it is to be noted that the locking shoulders 47 engage beneath the locking shoulder 49 on the container after the manner of a crown cap, and with the corrugated substantially tubular edge extending radially outward from the wall of the container.

This form of the invention has in common with the other forms hereinbefore described, the several features set forth except the non-corrugated characteristic of the bead. It will be noted that the bead is spaced from the in-struck locking shoulders 47 and that it substantially closes the lower ends of the grooves or channels formed by the corrugations, while at the same time providing an edge which is devoid of deep pockets, although some pockets are provided, due to the collapsing of the bead, as shown in Figure 18. Nevertheless, there being provided here a coil which is not completely collapsed, the grooves are substantially closed by the curled edge.

In the forms hereinbefore described, the crown has been shown provided with the more or less conventional type of corrugation. I have found, however, that my invention is of particular value in connection with another modified form of crown cap. Such a cap is illustrated in Figures 21 to 24, inclusive, of this application and is described in detail in the co-pending application of John D. Elder, Serial No. 615,910, filed June 7, 1932. The cap 50 is characterized by a depending skirt 51 having a flange 52 bent preferably at substantially a right angle to the skirt. The flange comprises substantially plane portions 53 and substantially V-shaped ridges 54 joining said plane portions and extending above the latter. The top edges of the ridges lie in planes radial to the skirt 51 and are substantially parallel to the plane portions of the flange. In this type of cap, the edge of the flange is curled beneath the flange to provide a wire or bead 56. As will be observed, the portions of the wire or bead lying in the vertical planes of the plane portions which provide in-struck shoulders 55, are substantially circular or hollow (Figure 23), whereas the portions which lie in the vertical planes coinciding with the ridges 54 formed by the outwardly or upwardly directed portions of the flange, are somewhat flattened as shown in dotted lines in Figure 23, and as illustrated in Figure 18. In these respects, the cap is provided with a bead similar to that illustrated in Figures 14 to 20. It will be understood, of course, that the bead may be flattened to a greater or less degree, and, moreover, the inwardly curled portion beneath the flange may be devoid of corrugations so that only the flange is corrugated, whereas the curled portion therebeneath is not corrugated.

By the term "bead" or "wire" as used throughout this specification and claims, I intend to cover not only a tubular element as shown in Figure 6 or a similar tubular edge as shown in Figure 10, but also a substantially flattened curled edge. For example, the construction of Figure 10 may, in many instances, be effectively modified by flatening the wire or coil. This is accomplished by initially forming the substantially tubular coil of Figure 10 and then collapsing or producing a substantially flattened reinforce in one operation. This construction is illustrated in Figure 11 where the bead is completely collapsed, and in Figures 18 and 23 where the tubular curl is partially collapsed.

I claim:

1. A metallic cap of the crown type having a depending corrugated skirt and terminating in a corrugated flange normally extending outwardly at substantially right angles to the skirt, the ridges of the corrugations terminating short of the free end of the flange, said flange having its edge curled inwardly to provide an annular reinforcing bead, said flange arranged when the cap is applied to a container to be distorted so that the bead is positioned in substantially vertical alignment with the skirt in order to provide a continuous, smooth, non-flaring exposed skirt surface.

2. A cap having a skirt portion provided with corrugations forming inwardly directed locking shoulders, said skirt provided with a flange or rim extending at substantially right angles with respect to the skirt, said rim being provided with plane portions spaced apart by the substantially V-shaped ridges of the corrugations, the ridges terminating short of the free edge of the flange, the free edge of the flange being curled inwardly beneath the flange or rim and forming a smooth continuous bead, said cap when applied to a container having the flange or rim portion thereof substantially in vertical alignment with the skirt and the bead of said rim presenting a smooth continuous surface.

3. A cap having a skirt portion provided with corrugations forming inwardly directed locking shoulders, said skirt provided with a flange or rim extending at substantially right angles with respect to the skirt, said rim being provided with plane portions spaced apart by the substantially V-shaped ridges of the corrugations, the ridges terminating short of the free edge of the flange, the free edge of the flange being curled inwardly beneath the flange or rim and forming a smooth continuous hollow bead, said cap when applied to a container having the flange or rim portion thereof substantially in vertical alignment with the skirt and the bead of said rim presenting a smooth continuous surface.

CHARLES E. McMANUS.